United States Patent
Hirose et al.

(10) Patent No.: US 9,876,259 B2
(45) Date of Patent: Jan. 23, 2018

(54) CURRENT INTERRUPTION DEVICE AND ELECTRICITY STORAGE DEVICE USING THE CURRENT INTERRUPTION DEVICE

(71) Applicants: KABUSHIKI KAISHA TOYOTA JIDOSHOKKI, Kariya-shi, Aichi (JP); EAGLE INDUSTRY CO., LTD., Tokyo (JP)

(72) Inventors: Takayuki Hirose, Kariya (JP); Hirokuni Akiyama, Kariya (JP); Motoaki Okuda, Kariya (JP); Atsushi Minagata, Kariya (JP); Hiroyasu Nishihara, Kariya (JP); Shimpei Mune, Kariya (JP); Toshiaki Iwa, Tokyo (JP); Yoshihiro Ogawa, Tokyo (JP); Makoto Mitsuyasu, Tokyo (JP); Norimitsu Akiyoshi, Tokyo (JP)

(73) Assignees: KABUSHIKI KAISHA TOYOTA JIDOSHOKKI, Aichi (JP); Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 14/908,729

(22) PCT Filed: Apr. 3, 2014

(86) PCT No.: PCT/JP2014/059822
§ 371 (c)(1),
(2) Date: Jan. 29, 2016

(87) PCT Pub. No.: WO2015/015841
PCT Pub. Date: Feb. 5, 2015

(65) Prior Publication Data
US 2016/0190657 A1    Jun. 30, 2016

(30) Foreign Application Priority Data
Jul. 30, 2013 (JP) .................................. 2013-158199

(51) Int. Cl.
*H01H 35/34* (2006.01)
*H01M 10/42* (2006.01)
(Continued)

(52) U.S. Cl.
CPC ........ *H01M 10/4257* (2013.01); *H01H 35/34* (2013.01); *H01M 2/06* (2013.01);
(Continued)

(58) Field of Classification Search
CPC .............. H01H 35/34; H01M 10/4235; H01M 10/4257; H01M 2200/20; H01M 2/06; H01M 2/30; H01M 2/345
See application file for complete search history.

(56) References Cited

U.S. PATENT DOCUMENTS 5,567,539 A * 10/1996 Takahashi ............ H01H 37/323
429/57
5,705,290 A *  1/1998 Azema ................ H01M 2/1235
429/53
(Continued)

FOREIGN PATENT DOCUMENTS

JP         6-215746 A     8/1994
JP         7-254401 A    10/1995
(Continued)

OTHER PUBLICATIONS

International Preliminary Report on Patentability dated Feb. 11, 2016, issued by the International Bureau in corresponding International Application No. PCT/JP2014/059822.
(Continued)

*Primary Examiner* — Miriam Stagg
*Assistant Examiner* — Lilia Nedialkova
(74) *Attorney, Agent, or Firm* — Sughrue Mion, PLLC (57) ABSTRACT

A current interruption device includes a deforming plate, a contact plate and a conducting plate which configure a current path. The deforming plate includes one surface on an
(Continued)

opposite side from the contact plate facing a first space, a pressure of which is retained to a same pressure as the internal pressure of the casing and the other surface opposed to the contact plate facing a second space, a pressure of which is retained to a same pressure as an external pressure of the casing. When the internal pressure rises above the predetermined level, the second contact portion is separated from the conducting plate by deformation of the deforming plate toward the contacting plate.

7 Claims, 8 Drawing Sheets

(51) Int. Cl.
*H01M 2/06* (2006.01)
*H01M 2/30* (2006.01)
*H01M 2/34* (2006.01)

(52) U.S. Cl.
CPC .............. *H01M 2/30* (2013.01); *H01M 2/345* (2013.01); *H01M 10/4235* (2013.01); *H01M 2200/20* (2013.01)

(56) References Cited

U.S. PATENT DOCUMENTS

| | | | |
|---|---|---|---|
| 5,738,690 A * | 4/1998 | Hughett | H01M 2/0202 137/260 |
| 5,766,790 A | 6/1998 | Kameishi et al. | |
| 6,136,464 A * | 10/2000 | Wakabe | H01M 2/06 429/53 |
| 6,555,263 B1 * | 4/2003 | Kim | H01M 2/1241 429/53 |
| 2008/0085447 A1 * | 4/2008 | Kim | H01M 2/0417 429/121 |
| 2015/0079432 A1 | 3/2015 | Okuda et al. | |

FOREIGN PATENT DOCUMENTS

| | | |
|---|---|---|
| JP | 9-106800 A | 4/1997 |
| JP | 9-129214 A | 5/1997 |
| JP | 10-233199 A | 9/1998 |
| JP | 2000-315493 A | 11/2000 |
| JP | 2001-229913 A | 8/2001 |
| JP | 2009-48866 A | 3/2009 |
| WO | 2013/154166 A1 | 12/2015 |

OTHER PUBLICATIONS

JPO Office Action for Application No. 2013-158199 dated Jun. 23, 2015.
International Search Report for PCT/JP2014/059822 dated Jun. 3, 2014 [PCT/ISA/210].
Written Opinion for PCT/JP2014/059822 dated Jun. 3, 2014 [PCT/ISA/237].

* cited by examiner

CURRENT INTERRUPTION DEVICE AND ELECTRICITY STORAGE DEVICE USING THE CURRENT INTERRUPTION DEVICE

TECHNICAL FIELD

This application is a National Stage of International Application No. PCT/2014/059822, filed on Apr. 3, 2014, which claims priority to Japanese Patent Application No. 2013-158199 filed on Jul. 30, 2013, the contents of which are hereby incorporated by reference into the present application. The present invention relates to a current interruption device and an electricity storage device using the current interruption device.

BACKGROUND ART

An importance of an electricity storage device such as a lithium ion battery, a nickel-metal hydride battery, and other types of secondary batteries (rechargeable batteries) is increasing as an onboard power source for vehicles, and a power source for computers and portable terminals. Especially, the lithium ion battery is expected to be used as high-output power source to be installed in vehicles. The lithium ion battery can provide a high energy concentration while being light weight. As a typical structure of a secondary battery, a battery with a sealed structure (sealed battery) in which an electrode assembly and an electrolyte are housed in a casing, and the casing is sealed can be exemplified.

In charging this battery, a current exceeding a normal level may flow in the battery upon when a defect is present in the battery or when a charger functions improperly. As a result, the battery may be brought to be in an overcharged state. In a case where an abnormality such as the overcharged state occurs in the battery, gas may be generated within the sealed casing. A pressure inside the casing (internal pressure) may increase, and the battery (casing) may swell, or the casing may break due to the gas pressure. As a countermeasure addressing such a defect, a battery provided with a current interruption device is proposed. The current interruption device cuts off a current passage between the electrode assembly housed in the casing and an electrode terminal exposed outside of the casing when the internal pressure of the sealed casing rises to a predetermined internal pressure so as to secure safety of the battery (for example, see Patent Document 1 (Japanese Patent Application Publication No. H6-215746), Patent Document 2 (Japanese Patent Application Publication No. H7-254401), Patent Document 3 (Japanese Patent Application Publication No. H9-129214), and Patent Document 4 (Japanese Patent Application Publication No. H10-233199)).

Figure 12:
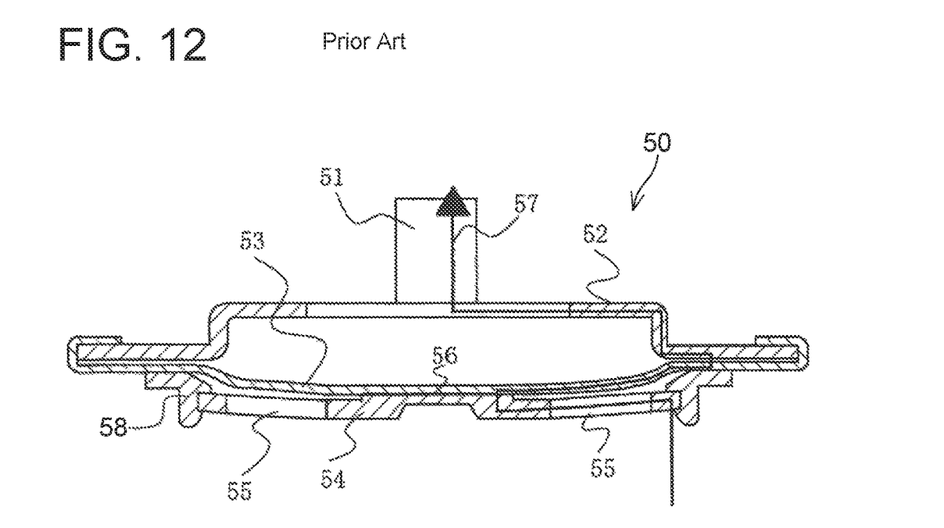
FIG. 12 is cross sectional view of a conventional current interruption device (under a normal state).
Figure 13:
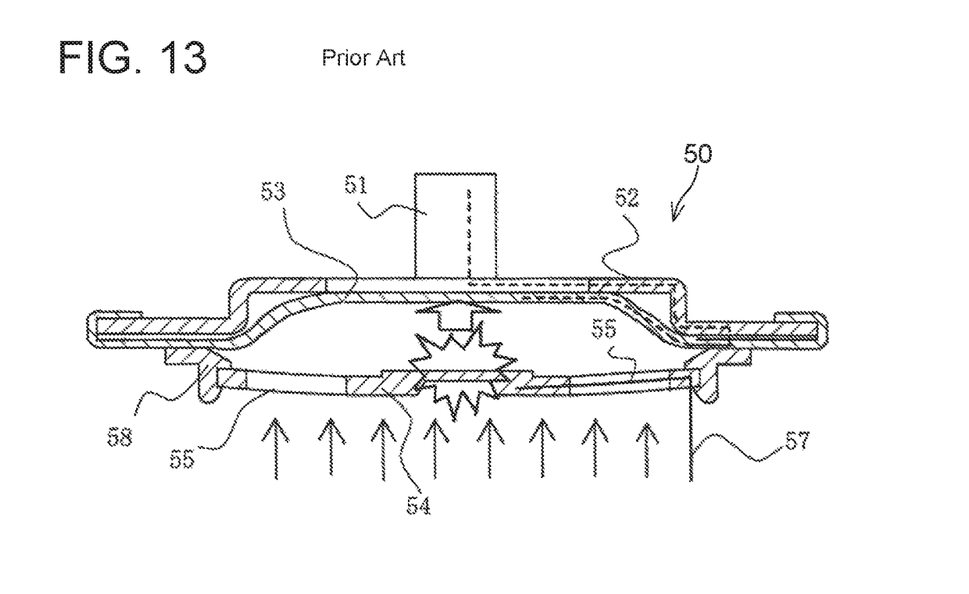
FIG. 13 is a cross sectional view of the conventional current interruption device (under a state after current interruption).

A conventional current interruption device will be described with reference to FIG. 12 and FIG. 13. A current interruption device 50 is attached to a casing of a sealed secondary battery. As shown in FIG. 12, the current interruption device 50 includes a seal-opening cover 52, an inversion plate 53, and a lead attaching plate 54. The seal-opening cover 52 has conductivity, and is connected to the external terminal 51. The inversion plate 53 has conductivity, and is arranged on an inner side of the seal-opening cover 52. The lead attaching plate 54 has conductivity, and is arranged on an inner side of the inversion plate 53. The lead attaching plate 54 is made of metal, and is fixed to a center portion (contact portion) of the inversion plate 53. A ventilation hole 55 is provided in the lead attaching plate 54, and an internal press of a battery is configured to act on the inversion plate 53. An arrow 57 shows a current passage when the battery is in a normal state. When the battery is in the normal state, a current flows through the lead attaching plate 54, the inversion plate 53, and the seal-opening cover 52 and reaches the external terminal 51 serially. Notably, a supporting member 58 supports a periphery of the lead attaching plate 54. The supporting member 58 is made of an insulating material.

When the battery comes to be in a state such as being overcharged, gas is generated inside the sealed casing, and an internal pressure of the casing increases. At this occasion, as shown in FIG. 13, the internal pressure of the casing acts on the inversion plate 53 through the ventilation hole 55 in the lead attaching plate 54. A fixed portion of a center portion (contact portion) 56 of the inversion plate 53 is broken off, and the inversion plate 53 is inverted upward. The current passage 57 is cut off and the current is thereby interrupted.

SUMMARY OF INVENTION

Technical Problem

In the aforementioned conventional current interruption device, the contact portion 56 between the lead attaching plate 54 and the inversion plate 53 is present within an electrolytic atmosphere. Due to this, the contact portion 56 is deteriorated by the electrolyte and its surrounding environment, and reliability of the current interruption device may be reduced. The applicant of this application provided a technique to solve the above problem in Japanese Patent Application No. 2012-090992 filed on Apr. 12, 2012 and Japanese Patent Application No. 2012-090630 filed on Apr. 12, 2012. That is, these patent applications provide techniques that can prevent the reliability from being reduced due to the deterioration of the contact portion of the current interruption device. Further, these patent applications are not disclosed at the time of filing of this patent application. Notably, the details of the techniques therein will be described in detail in the embodiments of the present description.

The present description aims to provide a technique that further improves the techniques of Japanese Patent Application No. 2012-090992 and Japanese Patent Application No. 2012-090630. Specifically, a technique that further ensures an operation to cut off a current passage upon when an internal pressure of a casing increases exceeding a predetermined level is provided.

Solution to Technical Problem (Basic Structure and Technical Feature)
A current interruption device disclosed in this description is provided with the following basic structure and technical features: (1) Inside of the current interruption device is sealed off from an atmosphere in a casing (outside of the current interruption device). (2) When an internal pressure of the casing is increased, a deforming plate is inverted by a pressure difference between the inside of the current interruption device and the outside of the current interruption device. (3) As described above, the inside of the current interruption device is sealed off from the atmosphere in the casing. Due to this, even if an arc is generated upon when a current passage is cut off, no influence will be given to the inside of the casing where hydrogen gas is being generated. Safety of the electricity storage device can be increased. (4)

The deforming plate receives external air pressure on a surface on an opposite side from a surface receiving a pressure inside the casing.

(Solution)

A current interruption device disclosed herein may be used for an electricity storage device. The current interruption device may be configured to electrically connect a positive or negative electrode terminal and an electrode assembly that comprises a positive electrode and a negative electrode. The current interruption device may be configured to interrupt a serial current path of the electrode terminal and the electrode assembly when an internal pressure of a closed casing accommodating the electrode assembly rises above a predetermined level. The current interruption device may comprise a deforming plate configured to deform when the internal pressure rises above the predetermined level. The current interruption device may comprise a contact plate and a conducting plate which configure the current path in a state where the contact plate and the conducting plate are electrically connected to the electrode assembly and the electrode terminal. The conducting plate may be disposed to be intervened between the deforming plate and the contact plate. The conducting plate may include a first contact portion configured to contact the contact plate. The contact plate may include a second contact portion configured to contact the first contact portion. The deforming plate may include one surface of the deforming plate on an opposite side from the contact plate, facing the first space, a pressure of which is retained to a same pressure as the internal pressure of the casing. The deforming plate may include the other surface opposed to the contact plate facing the second space, a pressure of which is retained to a same pressure as an external pressure of the casing through the communicating portion. The deforming plate may include a contacting portion configured to contact the first contact portion or the second contact portion. The current interruption device may be configured to be separable from the conducting plate by deformation of the deforming plate causing the contacting portion to move toward the contact plate when the internal pressure rises above the predetermined level.

In the above current interruption device, the contact portions between the conduction plate and the contact plate are separated by the deforming plate from an atmosphere where electrolyte exists. Due to this, the contact portions can be prevented from deteriorating by being subjected to influences of the electrolyte and their surrounding environment. Further, even if an arc is generated upon when a current passage is cut off, no influence will be given to the inside of the casing where hydrogen gas is being generated. Moreover, in the above current interruption device, the deforming plate is making contact only at a fixing portion on its outer periphery. Due to this, the deforming plate is not subjected to an influence of welding strength as in the conventional technique, and operates stably by the internal pressure.

Further, in the above current interruption device, the second space being the space located on a contact plate side relative to the deforming plate communicates with external air. Due to this, for example, even in a case where a gas flows into the second space from a space within the casing due to air tightness between the space within the casing and the second space being decreased and the like, the pressure of the second space can be prevented from rising. As a result, the pressure of the second space can more easily be maintained to a constant level, and the pressure difference between the first space and the second space can more easily be generated upon when the pressure in the space within the casing is increased due to overcharging and the like. Due to this, the current interruption device can be prevented from having difficulty operating by an insufficient pressure difference between the first space and the second space in cases of overcharging and the like.

The current interruption device disclosed in this description can prevent deterioration of the contact portions, and prevent the current interruption device from having difficulty operating.

DESCRIPTION OF EMBODIMENTS

Preferred technical aspects of embodiments disclosed in this description will be listed. Note that each of the matters described below has independent technical usefulness.

(Feature 1) The current interruption device disclosed herein may be typically attached to an opening provided on a wall of an electricity storage device casing. The current interruption device may comprise a cover, on side portion of which is exposed to the outside of the casing through the opening and, the other side of which configures a part of a case body of the current interruption device. A communicating hole piercing the cover from one side portion to the other side portion may be provided in the cover. The second space may be retained to the same pressure as the external pressure of the casing through the communicating hole.

In the current interruption device, the second space is maintained at the external pressure by the communicating hole provided in the cover. Due to this, the current interruption device is prevented from having difficulty operating by insufficient pressure difference between the first space and the second space in cases of overcharging or the like.

(Feature 2) In the current interruption device disclosed herein, the one side of the cover exposed to the outside of the casing may include a connecting portion connecting a conductive member configured to supply electric power to an external device. The conductive member may be typically a power cable.

The connecting portion corresponds to an electrode terminal. That is, in the above current interruption device, the current interruption device and the electrode terminal are integrated. Due to this, there is no need to provide an additional wiring or the like between the current interruption device and the electrode terminal. Due to this, an electric resistance in the current passage can be reduced.

(Feature 3) In the current interruption device disclosed herein, the connecting portion may include an inner thread provided on an inner surface of the communicating hole of the cover. The inner thread may be provided for fixing the conductive member.

In the above current interruption device, the inner thread is provided in the communicating hole opening on one side of the cover. For example, a bolt can be engaged with this inner thread. A cable (conductive member) for supplying power to an external device can be placed between a bolt head and the one side of the cover, and be fixed therebetween. That is, in the above current interruption device, the external device can be connected by utilizing the communicating hole of the cover which allows the second space and the space on the outside of a casing wall to be communicated. Due to this, an attachment hole or the like for connecting the conductive member does not need to be provided additionally. Due to this, manufacturing cost for the current interruption device can be reduced.

(Feature 4) In the current interruption device disclosed herein, an outer thread may be provided on a side surface on the one side of the cover exposed to the outside of the casing. The current interruption device may include a fixing member engaged with an outer thread. The current interruption device may be fixed to the casing by holding a wall of the casing between the fixing member engaged with the outer thread and a part of the cover positioned in the casing.

In the above current interruption device, the outer thread is provided at a portion that is exposed on the outside of the cover. Due to this, the current interruption device can be attached to the casing by engaging the inner thread of the fixing member to the outer thread. Due to this, in the above current interruption device, the current interruption device can be attached to the casing while allowing the second space to communicate with external air by exposing the cover to the space on the outside of the casing.

(Feature 5) In the current interruption device disclosed herein, a center portion of the deforming plate may provide an insulating projection projecting toward the contact plate, and the projection may include the contacting portion.

In the above current interruption device, the conduction plate and the contact plate are prevented by the insulating projection from making contact again after the current passage is cut off.

(Feature 6) The current interruption device disclosed herein may include a contacting member disposed between the deforming plate and the conducting plate and an insulating cap. The insulating projection is composed of the contacting member and the cap. The contacting member may be disposed in a center portion of a surface of the deforming plate facing the conducting plate. The cap may include a cap portion covering the contacting member, and a guide portion regulating a position of the cap portion in a plane orthogonal to a direction connecting the deforming plate and the conducting plate.

In the above current interruption device, the contacting member is positioned at the center portion of the deforming plate, and the insulating cap covers the contacting member. Further, the cap provides positional restriction to the contacting member of the deforming plate. Due to this, the insulating projection can be provided at the center portion of the deforming plate by a simple structure.

Hereinbelow, embodiments of a current interruption device and an electricity storage device disclosed in the present description will be described. Notably, in the electricity storage device disclosed in this description, various types of parts may be employed for its configuration other than the current interruption device. Further, the electricity storage device described herein may for example be installed in a vehicle, and provide power to a motor.

As an example of an electricity storage device, a sealed secondary battery, a sealed capacitor, and the like may be exemplified. As an example of the secondary battery, a type of battery having a relatively large capacity by which discharge and charge of large current is performed, for example, a secondary battery such as a lithium ion battery, a nickel-metal hydride battery, a nickel-cadmium battery, a lead-acid battery may be exemplified. Notably, in the following description, the lithium ion battery will be described. As an example of an electrode assembly for the secondary battery, an electrode assembly of a laminate type in which cells having electrode pairs (positive electrode and negative electrode) facing each other via a separator are laminated in plural layers, and an electrode assembly of a roll type in which sheet-shaped cells having electrode pairs facing each other via a separator is wound up in a roll may be exemplified. Notably, in the description below, the description will be given on an electricity storage device in which both of a positive terminal and a negative terminal are exposed in one direction of a casing. However, the technique disclosed in this description can be adapted to an electricity storage device of a type in which the casing functions as a terminal for one of the polarities (for example, negative pole) while a terminal of the other polarity (for example, positive pole) is fixed to the casing in a state of being insulated from the casing such as in a cylindrical battery.

First Embodiment

Figure 1:
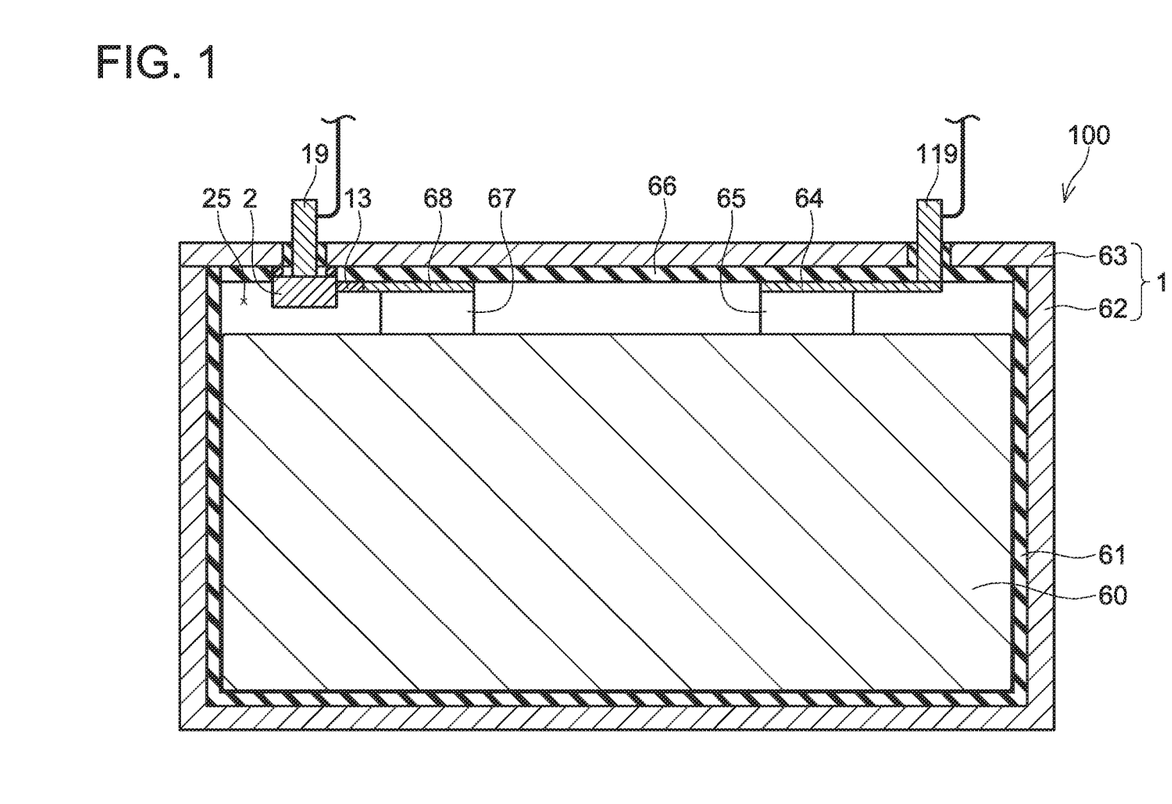
FIG. 1 is a cross sectional view showing an overall configuration of an electricity storage device 100 of a first embodiment.

As shown in FIG. 1, an electricity storage device 100 comprises a casing 1, an electrode assembly 60, a negative terminal 19, a positive terminal 119, and a current interruption device 2. The casing 1 comprises a rectangular box-shaped main body part 62, and a rectangular plate-shaped cover pert 63 that closes the main body part 62. The main body part 62 and the cover part 63 are made of metal (for example, stainless steel, aluminum). In the following description, the main body part 62 and the cover part 63 may simply be termed the casing 1. A space 25 inside the casing 1 stores therein the electrode assembly 60 provided with a positive electrode and a negative electrode. The casing 1 and the electrode assembly 60 are insulated by an insulating sheet 61. A positive tab 65 is fixed to the positive electrode. A negative tab 67 is fixed to the negative electrode.

The negative terminal 19 and the positive terminal 119 are fixed to the casing 1 (cover part 63). Although not shown, an insulating sheet and the like is insulating the negative terminal 19 from the casing 1, and the positive terminal 119 from the casing 1. The negative terminal 19 is electrically connected to the negative tab 67 (negative electrode) via the current interruption device 2 and a negative lead 68. The detailed description of the current interruption device 2 will be given later. Notably, the current interruption device 2 and the negative lead 68 are connected by a conductive connecting member 13. The positive terminal 119 is electrically connected to the positive tab 65 (positive electrode) via a positive lead 64. The negative lead 68 and the positive lead 64 are insulated from the casing 1 by an insulating sheet 66 attached to the casing 1 (cover part 63). Notably, in the electricity storage device 100 of the present embodiment, the negative terminal 19 and the current interruption device 2 are configured to be integral (detailed description will be given later).

The electrode assembly 60 is immersed in liquid electrolyte. The electrolyte contains lithium salt-containing supporting electrolyte within its solution. As the solution, for example, FEC (fluoroethylene carbonate) may be used. As the supporting electrolyte, for example, LiPF6 (lithium hexafluorophosphate) may be used. An aromatic monomer additive is included in the electrolyte. When an overvoltage is applied to the electrode assembly 60, the monomer additive contained in the electrolyte is polymerized, and hydrogen gas is generated. This generation of the hydrogen gas increases a pressure of the internal space 25 of the casing 1.

Figure 2:
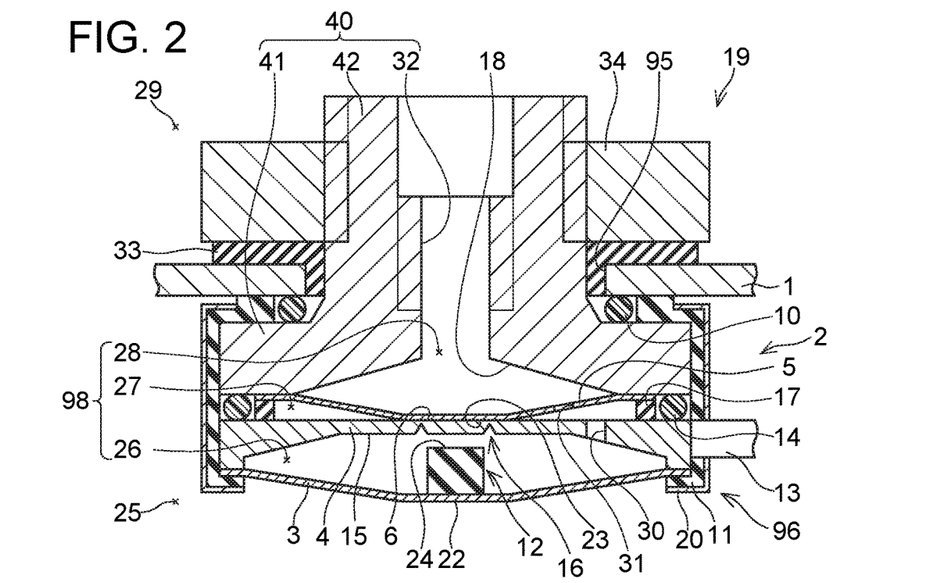
FIG. 2 is a partially enlarged cross sectional view of a current interruption device 2 (under a normal state) of the first embodiment.
Figure 3:
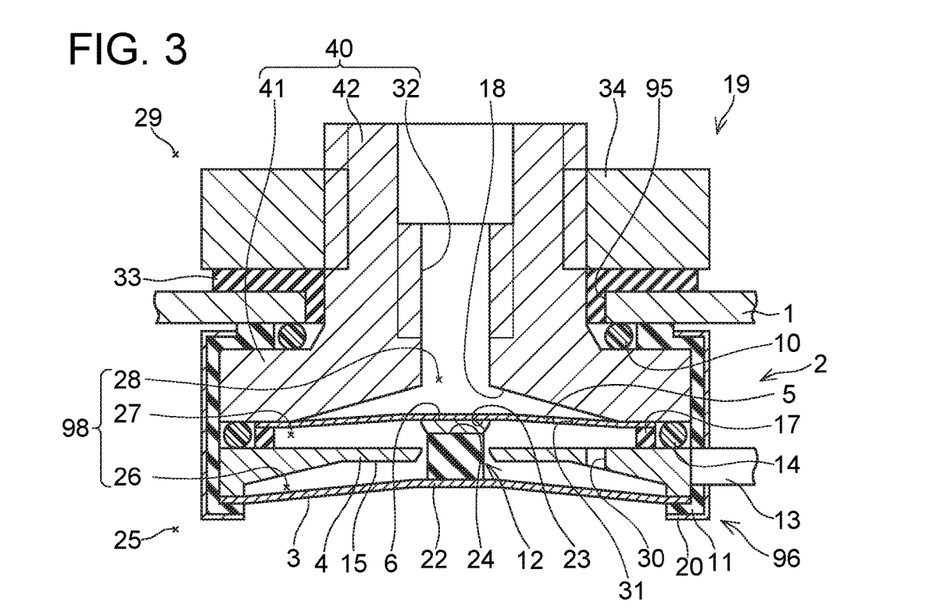
FIG. 3 is a partially enlarged cross sectional view of a current interruption device 2 (under a state after current interruption) of the first embodiment.

The current interruption device 2 will be described with reference to FIG. 2 and FIG. 3. Notably, in FIGS. 2 and 3, the depiction of the electrode assembly 60 (see FIG. 1) having the positive electrode and the negative electrode is omitted. The electrode assembly 60 is arranged on a lower side of FIGS. 2 and 3. The current interruption device 2 electrically connects the electrode assembly 60 and the negative terminal 19. The current interruption device 2 interrupts a gas flow between the inside of the casing 1 where the electrode assembly 60 is housed and an outside of the casing 1. The current interruption device 2 cuts off a serial current passage of the electrode assembly 60 and the negative terminal 19 when the internal pressure of the casing 1 is increased exceeding a predetermined level.

The aforementioned "predetermined level of internal pressure" means the internal pressure of the casing 1 when the electricity storage device 100 is in a state of being overcharged (having overvoltage) or a state of being overheated (reaching a temperature of thermal runaway of active material). The "predetermined level of internal pressure" is set based on conditions such as a capacity, output voltage, and the like of the electricity storage device 100.

The current interruption device 2 is arranged inside the casing 1 of the electricity storage device 100, and provides sealing so that the gas inside the casing 1 (outside of the current interruption device 2) does not flow to an internal space 98 of the current interruption device 2 (which will be described later in detail). Notably, a configuration for attaching the current interruption device 2 to the casing 1, such will be described later in detail. A structure of the current interruption device 2 will be described in an order from the inside of the casing 1 (lower side of FIG. 2) of the electricity storage device 100 toward the outside of the casing 1 (upper side of FIG. 2). The current interruption device 2 comprises a deforming plate 3 including a pressure receiving portion 22, a conduction plate 4, and a contact plate 5. The deforming plate 3 is deformable, and inhibits the gas flow. The pressure receiving portion 22 of the deforming plate 3 is configured to receive the internal pressure of the casing 1. The conduction plate 4 is electrically connected to the electrode assembly 60. The conduction plate 4 is made of conductive metal, and has a ring-shaped groove (breakable groove 16) provided at substantially a center thereof. A portion surrounded by the breakable groove 16 is termed a first contact portion 6. The contact plate 5 is also made of conductive metal, and a part thereof makes contact with the first contact portion 6. In the contact plate 5, the part making contact with the first contact portion 6 will be termed a second contact portion 23. The deforming plate 3 is arranged on an outer portion of the current interruption device 2, and configures an outer surface of the current interruption device 2. The conduction plate 4 and the contact plate 5 are respectively arranged on an inner side of the deforming plate 3.

In the current interruption device 2, a portion of the first contact portion 6 provided in the conduction plate 4 on an opposite side (lower side in FIG. 2) from its side making contact with the second contact portion 23 can make contact with the deforming plate 3. The breakable groove 16 provided in the conduction plate 4 is configured to break the conduction plate 4 along the groove when the first contact portion 6 receives a predetermined load. By the conduction plate being broken off along the breakable groove 16, the first contact portion 6 is separated from the conduction plate 4. In the current interruption device 2, the contact portions 6, 23 of the conduction plate 4 and the contact plate 5 are sealed by the deforming plate 3 from an atmosphere where the electrolyte is present. Due to this, the contact portions 6, 23 are prevented from being deteriorated due to the electrolyte or their surrounding environment. Further, even if are (spark) is generated upon when the current passage is cut off, no influence will be given to the inside of the casing 1 where the hydrogen gas is being generated.

The deforming plate 3 is formed of a thin plate. Specifically, the deforming plate 3 is a metal diaphragm. An outer periphery of the deforming plate 3 is fixed by an insulating supporting member 11. The outer periphery of the deforming plate 3 and an outer periphery of the conduction plate 4 are joined by welding. Due to this, the outer periphery of the deforming plate 3 is maintained airtight. However, the outer periphery of the deforming plate 3 may be maintained airtight by other measures, such as a sealing member or the like. An insulating projection 12 that projects toward the contact plate 5 is provided at a center portion of the deforming plate 3. A shape of the projection 12 is for example cylindrical.

The center portion of the deforming plate 3 is configured as the pressure receiving portion 22. A surface of the pressure receiving portion 22 on the lower side in FIG. 2 faces the space 25 inside the casing 1. A surface of the pressure receiving portion 22 on the upper side in FIG. 2 faces the internal space 98 of the current interruption device 2. In other words, the surface of the pressure receiving portion 22 on the lower side in FIG. 2 receives a pressure of the space 25 inside the casing 1. The surface of the pressure receiving portion 22 an the upper side in FIG. 2 receives a pressure of the internal pace 98 of the current interruption device 2.

When the internal pressure of the casing 1 is increased exceeding the predetermined level, the deforming plate 3 deforms toward the outside of the casing 1 (upward) by the increase in the internal pressure of the casing 1. Specifically, a contacting portion 24 of the projection 12 moves toward the first contact portion 6 and makes contact, and provides impact onto the contact portions 6, 23 of the conduction plate 4 and the contact plate 5. As a result, the conduction plate 4 breaks along the breakable groove 16, and the first contact portion 6 and the second contact portion 23 are separated from the conduction plate 4. Upon when the deforming plate 3 deforms toward the outside of the casing 1 by the increase in the internal pressure of the casing 1, it deforms beyond a supporting point of the outer periphery of the deforming plate 3, and is thereby inverted. When the current interruption device 2 is to be assembled, or when the internal pressure of the casing 1 is normal (equal to or less than the predetermined level), the deforming plate 3 maintains a state of being projected toward the inside of the casing 1 (downward). By the deforming plate 3 being inverted, a displacing amount for the deforming plate 3 to deform (stroke) can sufficiently be secured. Notably, the deforming plate 3 deforms upon when the pressure in the casing 1 is increased equal to or greater than the predetermined level, by a so-called snap bucking. Notably, the snap bucking refers to a phenomenon which takes place when a plate member of which entirety is curved with its both ends or periphery being supported so that its center projects to one side is applied with a load from a curve-protruding direction, where a discontinuous deformation is generated so that a curving direction of the plate member is inverted suddenly toward the other side when the load exceeds a threshold load, and the inverted shape does not recover to its original shape even when the load is removed. In a case of the current interruption device 2, when the internal pressure of the casing 1 is increased and once the deforming plate 3 is deformed by the snap bucking, the deformation of the deforming plate 3 is not restored to its original form even when the internal pressure of the casing 1 drops. The projection 12 of the deforming plate 3 maintains the contact portions 6, 23 in the state of being separated from the conduction plate 4 even when the internal pressure of the casing 1 drops.

The center portion 15 of the conduction plate 4 is thinner in thickness as compared to other portions of the conduction plate 4. Specifically, a recess is provided at the center of the conduction plate 4 on a deforming plate 3 side. The contacting portion 24 of the projection 12 of the deforming plate 3 makes contact with the thin portion of the conduction plate 4 (center portion 15). That is, the contacting portion 24 makes contact with the first contact portion 6 of the conduction plate 4. The conduction plate 4 is provided with the breakable groove 16. The breakable groove 16 is provided on the surrounding of the portion where the contacting portion 24 is to make contact. Due to this, the conduction plate 4 is easily broken by the impact when the contacting portion 24 makes contact with the first contact portion 6. The breakable groove 16 is provided on an outer side than an outer periphery of the contacting portion 24 when seen in a plan view. Notably, the breakable groove 16 may be continuous, or may be discontinuous. That is, the breakable groove 16 may fully circumscribe the contacting portion 24, or may be provided partially around the contacting portion 24. Further the breakable groove 16 is not limited to the shape shown in FIG. 2, and it will suffice so long it has a shape that makes the thickness of the conduction plate 4 locally thin. The conduction plate 4 is provided with a communicating hole 30.

The contact plate 5 is a flat-shaped thin plate. As an example of the contact plate 5, a conductive metal diaphragm may be exemplified. An outer periphery of the contact plate 5 is fixed by the insulating supporting member 11. A center portion of the contact plate 5 configures the second contact portion 23 that makes contact with the conduction plate 4. The contact portions 6, 23 may be in a state where the center portion of the conduction plate 4 is making simple contact with the center portion of the contact plate 5. Alternatively, the contact portions 6, 23 may be in a state where the center portion of the conduction plate 4 and the center portion of the contact plate 5 are making contact by being fixed by welding or the like. An insulating member 17 is provided between the outer periphery of the contact plate 5 and the outer periphery of the conduction plate 4. Due to this, the outer periphery of the contact plate 5 and the outer periphery of the conduction plate 4 are electrically insulated. The contact plate 5 is provided with a communicating hole 31.

The cover 40 is arranged above the contact plate 5. The cover 40 is made of a conductive material. Metal for example may be used as the material for the cover 40. The cover 40 comprises a main body 41 and a cylinder portion 42. The main body 41 has a circular disk shape. The cylinder portion 42 has a cylindrical shape, and extends upward from a center portion of an upper surface of the main body 41. An outer periphery of the main body 41 of the cover 40 is supported by the insulating supporting member 11. The outer periphery of the main body 41 makes contact with the contact plate 5, and is electrically connected to the contact plate 5. A recess 18 that is dented upward (toward a side away from the contact plate 5) is provided on an inner surface of the cover 40 (surface on a contact plate 5 side). Specifically, a center portion of the covet 40 is dented upward than the outer periphery of the cover 40 (portion making contact with the contact plate 5). When the projection 12 of the deforming plate 3 makes contact with the conduction plate 4, the contact plate 5 deforms upward. The recess 18 is provided to ensure enough space for allowing the contact plate 15 to deform upward.

A through hole 95 is provided in an upper wall of the casing 1 (specifically, the cover part 63 of the casing 1) at a position where the negative terminal 19 is to be arranged. The cylinder portion 42 is exposed to the outside of the casing 1 from the through hole 95. The cover 40 comprises a communicating hole 32, which penetrates from a lower surface of the main body 41 to an upper end of the cylinder portion 42.

An insulating sealing member 14 is provided between the outer periphery of the cover 40 and the outer periphery of the conduction plate 4. The sealing member 14 is positioned on an outer side of the current interruption device 2 than the aforementioned insulating member 17. The sealing member 14 provides a seal between the cover 40 and the conduction plate 4, and a seal between the supporting member 11 and a space between the cover 40 and the conduction plate 4. Due to this, the electrolyte is surely prevented from making contact with the first contact portion 6 and the second contact portion 23.

Figure 4:
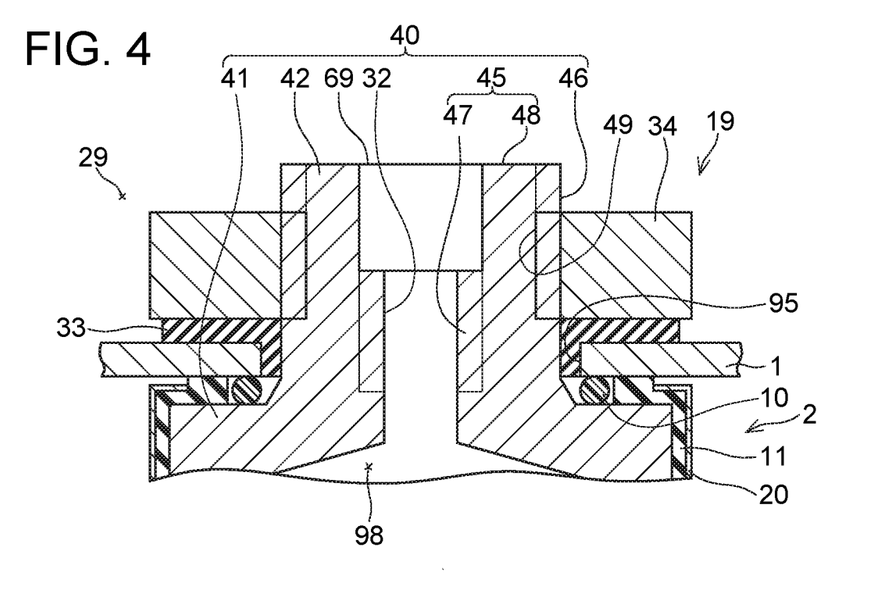
FIG. 4 is a partially enlarged cross sectional view of the current interruption device 2 of the first embodiment.

Notably, the cover 40 comprises a configuration for attaching the current interruption device 2 to the casing 1 (specific configuration of which is an outer thread 46, etc.) (to be described later in detail). Further, the upper end of the cylinder portion 42 of the cover 40 as shown in FIG. 4 is provided with a connecting portion 45 for connecting an external device (for example, another electricity storage device, a motor, or the like) to the current interruption device 2 (to be described later in detail). That is, in the electricity storage device 100 of the present embodiment, the upper end of the cylinder portion 42 is configured to be the negative terminal 19 by the connecting portion 45 being provided at the upper end of the cylinder portion 42.

The supporting member 11 has insulating property, and is made for example of resin. The supporting member 11 has a ring shape when seen in a plan view. A cross section of the supporting member 11 is a substantial U-shape. The outer periphery of the deforming plate 3 (specifically, an end of its outer periphery, and a lower surface of its outer periphery), the sealing member 14, the outer periphery of the conduction plate 4, the insulating member 17, the sealing member 14, and the outer periphery of the cover 40 (specifically, an end of its outer periphery, and a lower surface of its outer periphery) are positioned in this substantial U-shaped portion. Further, the deforming plate 3, the sealing member 14, the conduction plate 4, the insulating member 17, the sealing member 14, the contact plate 5, and the cover 40 are integrally retained by this substantial U-shaped portion. An outer surface of the supporting member 11 is covered by a metal-made holding member 20. The holding member 20 ensures retaining of the aforementioned members. Further, the holding member 20 seals the inside of the current interruption device 2.

In the current interruption device 2 of the present embodiment, the deforming plate 3, the conduction plate 4, the contact plate 5, and the cover 40 are integrally retained so as to configure the case body 96 of the current interruption device 2. The deforming plate 3 and the cover 40 respectively configure a part of this case body 96. The internal space 98 of the current interruption device 2 as aforementioned is a space within this case body 96. Further, the internal space 98 specifically includes a space 26 between the deforming plate 3 and the conduction plate 4, a space 27 between the conduction plate 4 and the contact plate 5, and a space 28 between the contact plate 5 and the cover 40. A portion where the current passage is to be cut off (that is, the contact portions 6, 23) is positioned within the internal space 98.

As described above, the conduction plate 4 is provided with the communicating hole 30. Due to this, the space 26 located under the conduction plate 4 and the space 27 located above the conduction plate 4 are communicated. Further, the contact plate 5 is provided with the communicating hole 31. Due to this, the space 27 located under the contact plate 5 and the space 28 located above the contact plate 5 are communicated. Thus, the internal space 98 of the current interruption device 2 is configured as one continuous space. Further, the cover 40 is provided with the communicating hole 32. Due to this, the internal space 98 of the current interruption device 2 is communicated with the space 29 outside the casing 1. As a result, the internal space 98 is maintained to be at the pressure of the space 29 outside the casing 1.

The current passage will be described. As aforementioned, the connecting member 13 of the conduction plate 4 is electrically connected to the electrode assembly 60 (see FIG. 1) arranged inside the casing 1. The first contact portion 6 making contact with the contact plate 5 is provided at the center portion of the conduction plate 4. Further, the second contact portion 23 making contact with the conduction plate 4 is provided at the center portion of the contact plate 5. Moreover, the outer periphery of the contact plate 5 is electrically connected to the main body 41 of the cover 40. As aforementioned, the upper end of the cylinder portion 42 of the cover 40 is configured to be the negative terminal 19. Due to this, the serial current passage from the electrode assembly 60 reaching the negative terminal 19 is thereby created.

For example, when the electricity storage device 100 is overcharged, gas is generated inside the sealed casing 1 and the internal pressure of the casing 1 increases. In this case, as shown in FIG. 3, the internal pressure of the casing 1 acts on the deforming plate 3, and the deforming plate 3 deforms upward (inverted). As aforementioned, the deforming plate 3 deforms by the snap bucking. When the deforming plate 3 deforms upward, the projection 12 collides into the conduction plate 4, and the conduction plate 4 is broken with the breakable groove 16 as the starting point thereof. The first contact portion 6 of the conduction plate 4 and the second contact portion 23 of the contact plate 5 are separated from the conduction plate 4. The contact plate 5 comes to be in an inverted state, or a state that was assumed before having been joined with the conduction plate 4. As a result, the current passage between the negative terminal 19 and the electrode assembly 60 is cut off, and the current is interrupted. That is, the conduction between the negative terminal 19 and the electrode assembly 60 is interrupted. In other words, the flow of current in the electricity storage device 100 is interrupted.

After when the current passage is cut off the conduction plate 4 and the contact plate 5 are prevented from making contact again by the projection 12. Notably, the deforming plate 3 does not make contact with any other component other than having its outer periphery fixed to the supporting member 11. Thus, the deforming plate 3 operates stably by the internal pressure of the casing 1. Further, when the projection 12 provided in the deforming plate 3 collides into the conduction plate 4, an impact force is applied to the conduction plate 4. By this impact force, the contact portion 6 can surely be separated even if the breaking load on the contact portions 6, 23 varies.

In the current interruption device 2 of the present embodiment, the internal space 98 of the current interruption device 2 communicates with the space 29 outside the casing 1 (that is, the external air). Due to this, the internal space 98 is retained to be at the external pressure of the casing 1. As a result, the pressure of the internal space 98 of the current interruption device 2 can easily be maintained constant. Specifically, for example, even in a case where air tightness between the space 25 in the casing 1 and the internal space 98 of the current interruption device 2 is reduced or the like, which led to the inflow of gas from the space 25 of the casing 1 to the internal space 98, this gas can be discharged to the space 29 outside the casing 1. Due to this, a pressure difference between the space 25 in the casing 1 and the internal space 98 of the current interruption device 2 can easily be generated upon hewn the pressure of the space 25 in the casing 1 is increased by overcharging or the like. Due to this, in the case of overcharging or the like, the operation of the current interruption device 2 being defected by insufficient pressure difference between the space 25 in the casing 1 and the internal space 98 of the current interruption device 2 can be prevented.

Figure 5:
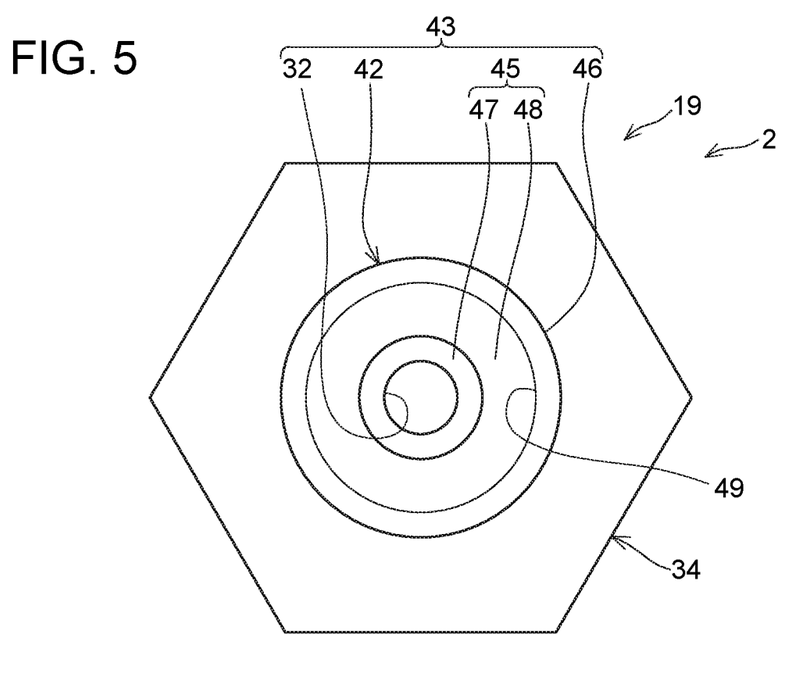
FIG. 5 is a planar view showing the current interruption device 2 of the first embodiment.

In the current interruption device 2 of the present embodiment, the deforming plate 3 is configured to deform by the so-called snap bucking upon when the pressure in the casing 1 increases to be equal to or exceeding the predetermined level. That is, the deforming plate 3 maintains a normal state when the pressure in the casing 1 is less than the predetermined level, and suddenly deforms when the pressure in the casing 1 increases to be equal to or exceeding the predetermined level. Due to this, the impact generated when the projection 12 collides into the conduction plate 4 can be increased Next, the connecting portion 45 of the cover 40 will be described with reference to FIG. 4 and FIG. 5. FIG. 5 is a plan view that sees the connecting portion 45 from above. The upper end of the cylinder portion 42 of the cover 40 comprises an attachment surface 48. The communicating hole 32 of the cover 40 includes an opening 69 that opens on the attachment surface 48. An inner thread 47 is provided on an inner surface of the communicating hole 32. Notably, in the drawings, threads of the inner thread are omitted. The attachment surface 48 and the inner thread 47 configure the connecting portion 45. A conductive member (cable, bus bar, etc.) for supplying power to the external device (for example, another electricity storage device, a motor or the like) can be connected to the connecting portion 45. With the connecting portion 45 being provided in the cover 40, the upper end of the cylinder portion 42 of the cover 40 is configured to be the negative terminal 19. In other words, the current interruption device 2 and the negative terminal 19 are configured to be integrated.

The connecting portion 45 can for example connect the conductive member according to the below method. Firstly, the conductive member such as a cable is arranged on the attachment surface 48. Next, a thread portion of a bolt for example is engaged with the inner thread 47 provided in the communicating hole 32 of the cover 40. Then, the conductive member is held between the bolt head and the aforementioned attachment surface 48. Due to this, the conductive member can be fixed.

The current interruption device 2 of the present embodiment is configured integral with the negative terminal 19. Due to this, an additional wiring does not need to be provided between the current interruption device 2 and the negative terminal 19. Due to this, the current passage can be shortened. Due to this, the electric resistance in the current passage can be reduced.

In the current interruption device 2 of the present embodiment, the communicating hole 32 of the cover 40 that communicates the space above the deforming plate 3 and the space on the outside of the casing 1 is utilized to connect a cable (conductive member) for supplying power to an external device. Thus, an attachment hole for connecting the cable from the external device does not need to be provided additionally. Due to this, manufacturing cost of the current interruption device 2 can be reduced.

Next, the configuration for attaching the current interruption device 2 to the casing 1 will be described with reference to FIG. 4 and FIG. 5. As aforementioned, the outer thread 46 is provided on the side surface of the cylinder portion 42 of the cover 40 (FIG. 4, FIG. 5). The cylinder portion 42 of the cover 40 is positioned on the inner side of the through hole 95 of the casing 1. The current interruption device 2 is fixed to the casing 1 of the electricity storage device by the fixing member 34. The fixing member 34 is provided with the inner thread 49 for engaging with the outer thread 46. As the fixing member 34, a so-called nut may be used. The fixing member 34 is positioned on the outside of the wall of the casing 1 in a state of having the inner thread 49 engaged with the outer thread 46. The wall of the casing 1 is intervened between the main body 41 of the cover 40 positioned on the inside of the casing 1 and the fixing member 34 positioned on the outside of the casing 1. Due to this, the current interruption device 2 is fixed to the casing 1.

An insulating sleeve 33 insulated the through hole 95 of the casing 1 from the side surface of the cylinder portion 42, and an upper surface of the wall of the casing 1 from the fixing member 34. A lower surface of the wall of the casing 1 and an upper surface of the main body 41 are insulated by the supporting member 11. The through hole 95 of the casing 1 is closed air tight by the sealing member 10.

Hereinbelow, an example of the method of attaching the cu rent interruption device 2 to the casing 1 will be described. Firstly, a state in which the outer thread 46 of the cover 40 and the inner thread 49 of the fixing member 34 are engaged, the main body 41 is positioned under the wall of the casing 1, and the fixing member 34 is positioned above the wall of the casing 1 is realized. Next, the outer thread 46 and the inner thread 49 are tightened by rotating the fixing member 34 relative to the cover 40. The current interruption device 2 is attached to the casing 1 by the wall of the casing 1 being held between the main body 41 and the fixing member 34.

In the current interruption device 2 of the present embodiment, the outer thread 46 is provided on the cylinder portion 42 of the cover 40. Due to this, the current interruption device 2 can be attached to the casing 1 by causing the outer thread 46 engage with the inner thread 49 of the fixing member 34. Due to this, the current interruption device 2 can be attached to the casing 1 while allowing the internal space 98 of the current interruption device 2 to communicate with the external air by exposing the cover 40 to the space 29 on the outside of the casing.

Second Embodiment

Figure 6:
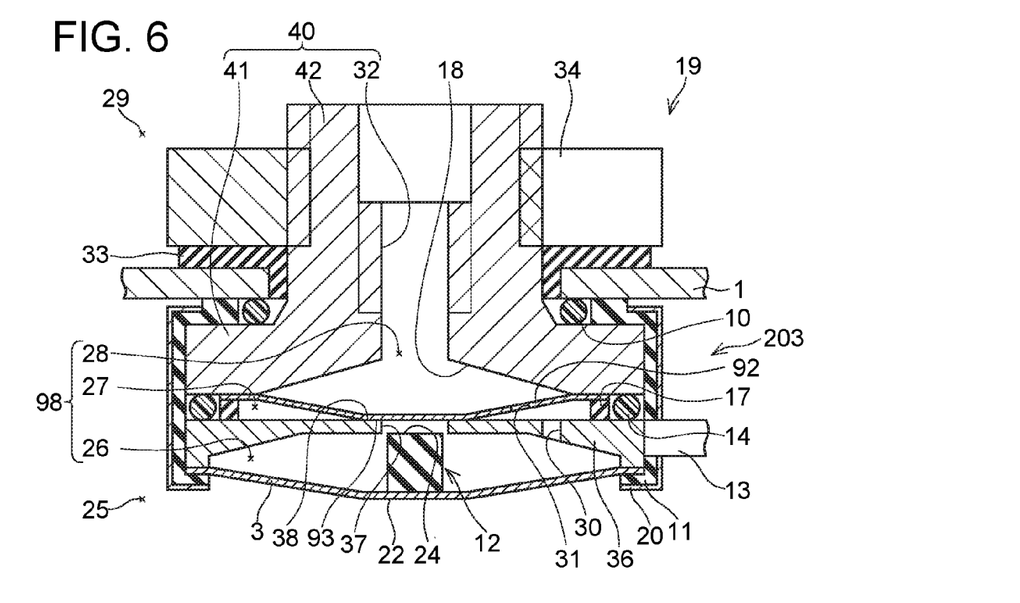
FIG. 6 is a partially enlarged cross sectional view of a current interruption device 203 (under a normal state) of se second embodiment.
Figure 7:
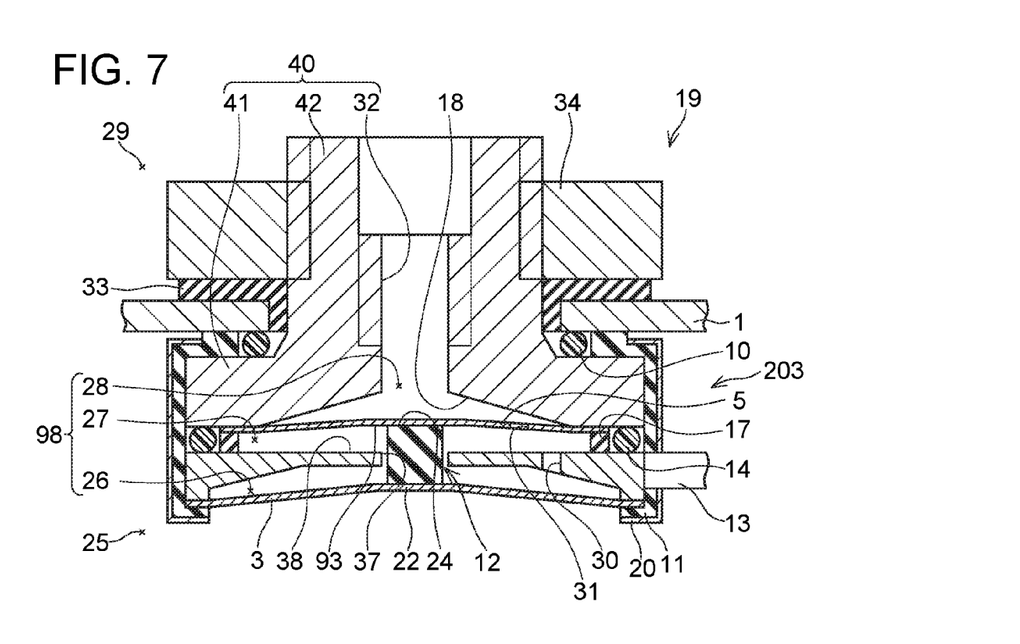
FIG. 7 is a partially enlarged cross sectional view of a current interruption device 203 (under a state after current interruption) of the second embodiment.

An electricity storage device 100 of the second embodiment modifies the current interruption device 2 of the electricity storage device 100 of the first embodiment to a current interruption device 203 (FIG. 6, FIG. 7). The current interruption device 2 of the first embodiment comprised the contact plate 5 and the conduction plate 4. With respect to this, the current interruption device 203 of the second embodiment comprises a contact plate 92 and a conduction plate 36. The conduction plate 4 comprised the breakable groove 16. With respect to this, the conduction plate 36 comprises a through hole 37. The through hole 37 is provided at a center portion of the conduction plate 36. The projection 12 can pass through the through hole 37. A second contact portion 93 of the contact plate 92 is provided around the through hole 37. That is, when the current interruption device 203 is seen in a plan view, the second contact portion 93 is provided on an outside of the through hole 37.

In the electricity storage device 100 of the present embodiment, the through hole 37 is provided in the conduction plate 36. Due to this, when the deforming plate 3 deforms, the projection 12 passes through the through hole 37 and directly collides into the contact plate 92 (FIG. 7). With the projection 12 colliding into the contact plate 92, a first contact portion 38 of the conduction plate 36 and the second contact portion 93 of the contact plate 92 are separated. Since the projection 12 directly collides into the contact plate 92, the first contact portion 38 of the conduction plate 36 and the second contact portion 93 of the contact plate 92 can more easily be separated.

Third Embodiment

Figure 8:
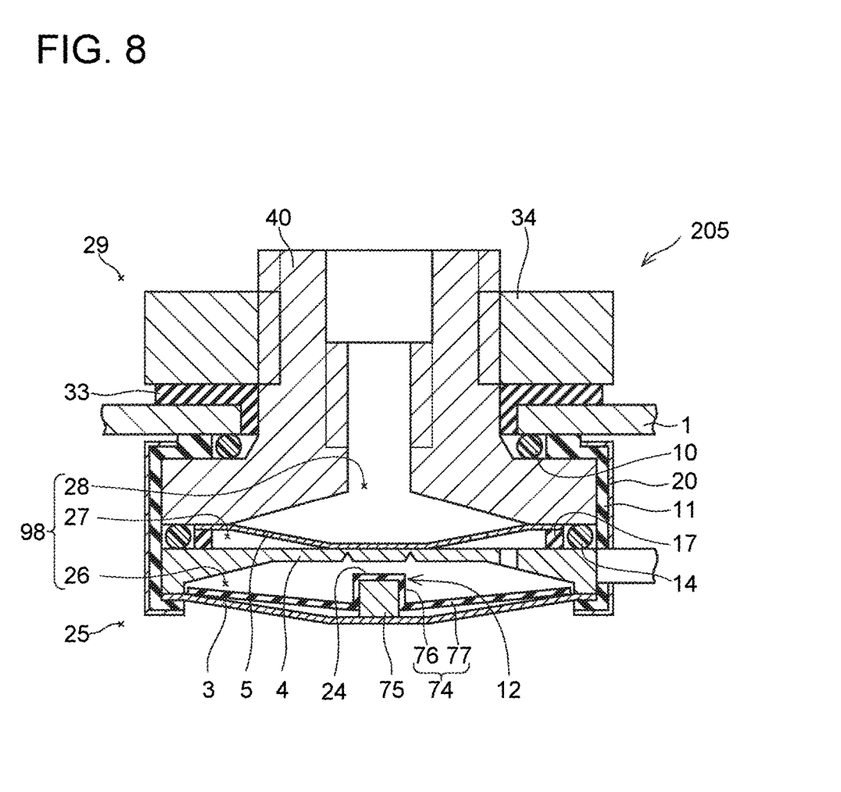
FIG. 8 is a partially enlarged cross sectional view of a current interruption device 205 of a third embodiment.

An electricity storage device 100 of the third embodiment modifies the current interruption device 2 of the electricity storage device 100 of the first embodiment to a current interruption device 205 (FIG. 8). The current interruption device 205 differs from the current interruption device 2 of the first embodiment in regards to a structure of the insulating projection 12 (specifically, of a configuration corresponding to the projection 12 of the first embodiment). In the current interruption device 205, the insulating projection 12 is configured of a contacting member 75 and a cap 74. The contacting member 75 and the cap 74 are arranged between the deforming plate 3 and the conduction plate 4. The contacting member 75 is arranged at a center portion on an upper surface of the deforming plate 3. The contacting member 75 for example has a cylindrical shape, and is arranged so as to be standing upright relative to the deforming plate 3. Metal, for example, may be used as a material for the contacting member 75. The cap 74 is made of an insulating material. The cap 74 comprises a cap portion 76 and a guide portion 77. The cap portion 76 has a container-like shape of which lower side is opened, and covers an upper surface and a side surface of the contacting member 75. The guide portion 77 is a flange-shaped portion positioned around the cap portion 76. An inner peripheral edge of the guide portion 77 is connected to an end of the cap portion 76 on a deforming plate 3 side. An outer peripheral edge of the guide portion 77 makes contact with a portion of the conduction plate 4 positioned on the outer periphery of the space 26. Due to this, the cap portion 76 has a positional restriction on the deforming plate 3. Due to this, the position of the contacting member 75 covered by the cap portion 76 is restricted on the deforming plate 3. In other words, the cap portion 76 has a positional restriction in a plane (horizontal plane at an arbitrary position in FIG. 8) that vertically intersects a direction connecting the deforming plate 3 and the conduction plate 4 (up and down direction of FIG. 8) cast thereon by the guide portion 77. Due to this, the position of the contacting member covered by the cap portion 76 in the plane that vertically intersects the direction connecting the deforming plate 3 and the conduction plate 4 is thereby restricted.

In the electricity storage device 100 of the third embodiment, the position of the contacting member 75 on the deforming plate 3 is restricted by the cap 74. Due to this, the contacting member 75 does not need to be fixed to the deforming plate 3 by welding or the like. Due to this, the insulating projection 12 can be provided at the center portion of the deforming plate 3 by a simple configuration. Notably, the cap 74 may have the positional restriction by other measures. For example, an outer peripheral edge of a guide portion 77 of the cap 74 may be fixed by being held between the deforming plate 3 and the conduction plate 4.

Fourth Embodiment

Figure 9:
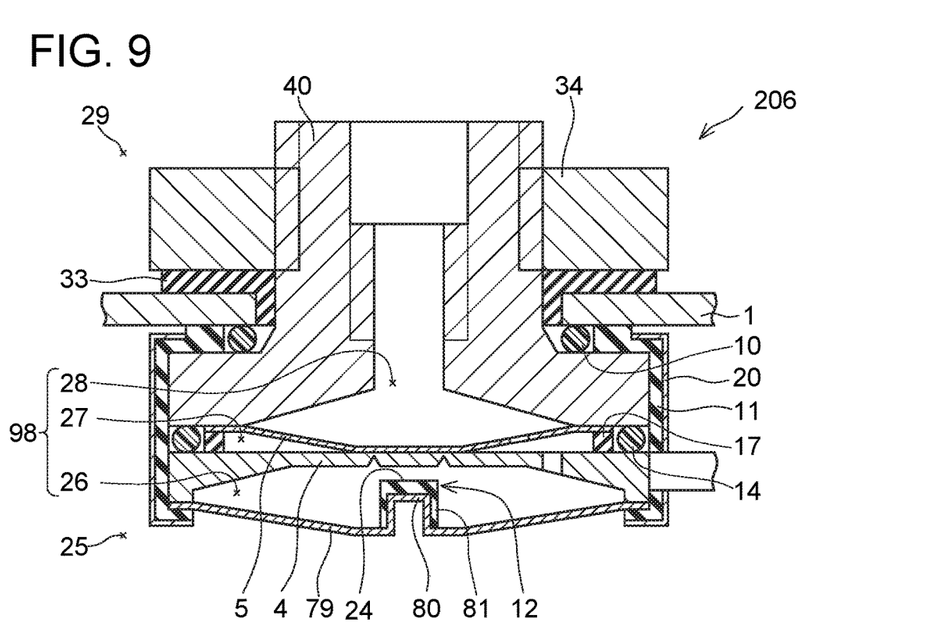
FIG. 9 is a partially enlarged cross sectional view of a current interruption device 206 of a fourth embodiment.

An electricity storage device 100 of the fourth embodiment modifies the current interruption device 2 of the electricity storage device 100 of the first embodiment to a current interruption device 206 (FIG. 9). The current interruption device 206 differs from the current interruption device 2 of the first embodiment in regards to a structure of the insulating projection 12. In the current interruption device 206 of the fourth embodiment, the insulating projection 12 is configured of a deforming plate 79 and a cap 81. A protruding portion 80 is provided on an upper surface at a center portion of the deforming plate 79. The protruding portion 80 is formed by the center portion of the deforming plate 79 being curved upward. As a method for forming the protruding portion 80 on the deforming plate 79, for example, pressing may be used. The cap 81 is made of an insulating material. The cap 81 covers an upper surface and a side surface of the protruding portion 80. The cap 81 and the protruding portion 80 are fixed for example by press-fitting.

In the electricity storage device 100 of the present embodiment, the insulating projection 12 is configured by fixing the cap 81 to the protruding portion 80 provided on the deforming plate 79. Thus, as differing from the third embodiment, the contacting member 75 does not need to be provided. Due to this, the projection 12 can be configured by a relatively smaller number of constituent parts.

Fifth Embodiment

Figure 10:
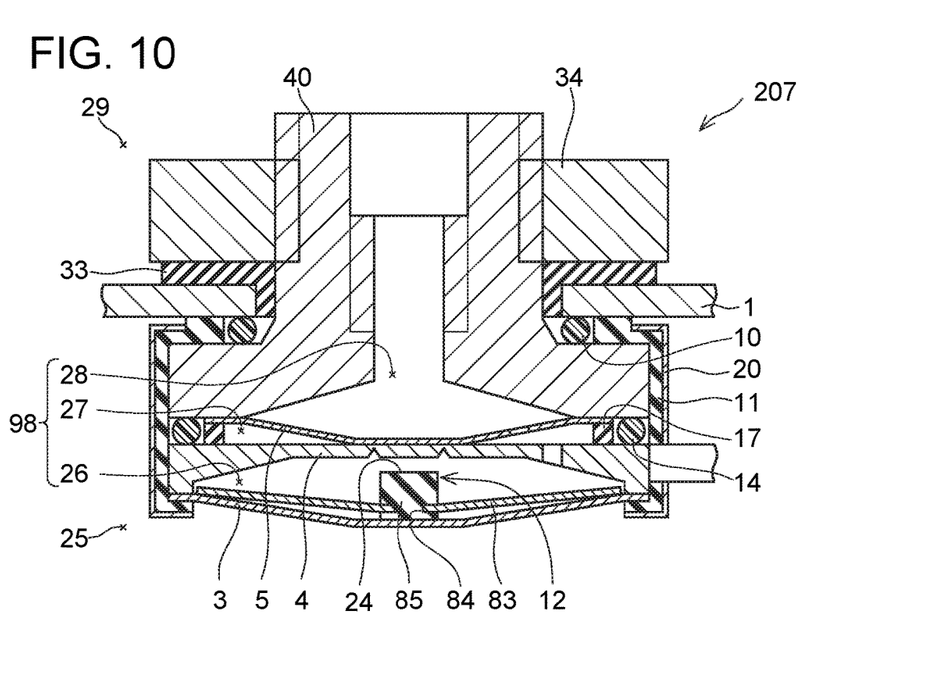
FIG. 10 is a partially enlarged cross sectional view of a current interruption device 207 of a fifth embodiment.

An electricity storage device 100 of the fifth embodiment modifies the current interruption device 2 of the electricity storage device 100 of the first embodiment to a current interruption device 207 (FIG. 10). The current interruption device 207 of the fifth embodiment differs from the current interruption device 2 of the first embodiment in regards to a structure of the insulating projection 12. In the current interruption device 207 of the present embodiment, the projection 12 is configured of a contacting member 85 and a guide 83. The contacting member 85 is made of insulating resin. The guide 83 has a disk shape. Metal for example may be used as a material of the guide 83. A center portion of the guide 83 is insert processed within the contacting member 85. Specifically, an opening 84 is provided at a center portion of the guide 83. The contacting member 85 is positioned on both an upper surface and a lower surface of the guide 83 at its center portion, at a position where the opening 84 is provided.

Similar to the guide portion 77 of the third embodiment, an outer peripheral edge of the guide 83 makes contact with the portion of the conduction plate 4 positioned on the outer periphery of the space 26. Due to this, the guide 83 has a positional restriction on the deforming plate 3. As a result, the position of the contacting member 85 is restricted in the deforming plate 3.

In the electricity storage device 100 of the present embodiment, the insulating projection 12 can be provided on the deforming plate 3 without forming any protruding portion on the deforming plate 3 by pressing or the like.

Sixth Embodiment

Figure 11:
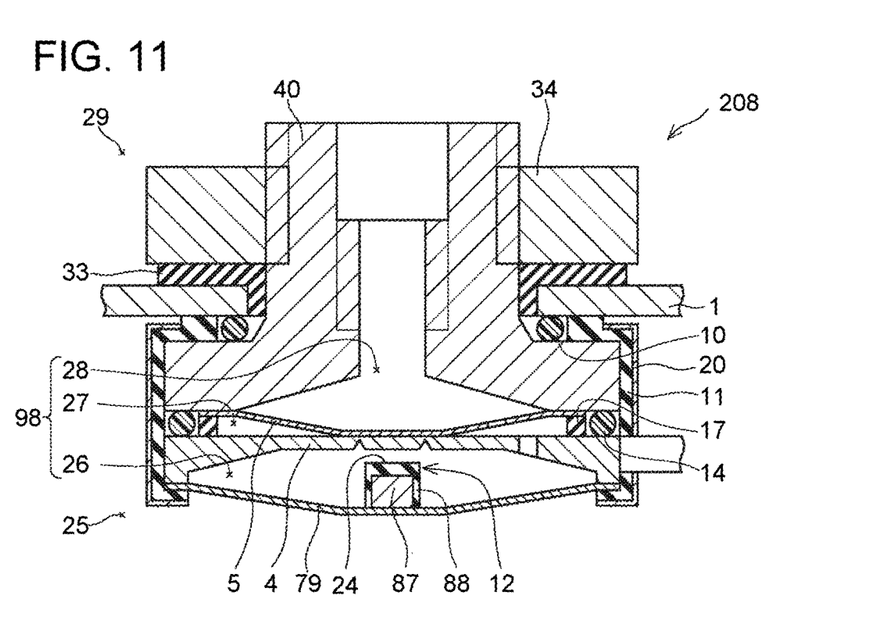
FIG. 11 is a partially enlarged cross sectional view of a current interruption device 208 of a sixth embodiment.

An electricity storage device 100 of the sixth embodiment modifies the current interruption device 2 of the electricity storage device 100 of the first embodiment to a current interruption device 208 (FIG. 11). The current interruption device 208 of the electricity storage device 100 of the sixth embodiment differs from the current interruption device 2 of the first embodiment in regards to a structure of the insulating projection 12. In the current interruption device 208, the insulating projection 12 is configured of a contacting member 87 and a cap 88. The contacting member 87 and the cap 88 are arranged between the deforming plate 3 and the conduction plate 4. The contacting member 87 is arranged at a center portion on an upper surface of the deforming plate 3. The contacting member 87 for example has a cylindrical shape, and is arranged so as to be standing upright relative to the deforming plate 3. Metal, for example, may be used as a material for the contacting member 87. Unlike the contacting member 75 of the third embodiment, the cap 87 of the sixth embodiment is fixed to the upper surface of the deforming plate 3. As a method for fixing the contacting member 87 on the upper surface of the deforming plate 3, welding may for example be used. The cap 88 is made of an insulating material. The cap 88 has a container-like shape of which lower side is opened, and covers an upper surface and a side surface of the contacting member 87. The cap 88 is fixed to the contacting member 87. As a method for fixing the cap 88 on the contacting member 87, press-fitting for example may be used.

In the electricity storage device 100 of the sixth embodiment, the insulating projection 12 can be provided without performing pressing or the like for forming any protruding shape on the deforming plate 3.

In the above embodiments, the insulating projection 12 is provided at the center portion of the insulating deforming plate 3. Due to this, the state in which the contact plate 5 and the conduction plate 4 are electrically insulated is maintained after the current passage had been cut off. However, the above embodiments may maintain the state in which the contact plate 5 and the conduction plate 4 are electrically insulated by other measures. For example, instead of welding the outer periphery of the conduction plate 4 and the outer periphery of the deforming plate 3, the outer periphery of the conduction plate 4 and the outer periphery of the deforming plate 3 may be insulated by an insulating member, and maintain the outer periphery of the conduction plate 4 and the outer periphery of the deforming plate 3 by the supporting member 11. Notably, an interval between the conduction plate 4 and the deforming plate 3 in this case is at a degree by which an insulation breakage does not occur when a vehicle load (voltage) is applied between the conduction plate 4 and the deforming plate 3 after when the current interruption device had been activated. In order to maintain the conduction plate 4 and the deforming plate 3 in the above state, the deforming plate 3 and the projection 12 may be made of a conductive material such as metal. Instead of providing the insulating projection 12 at the center portion of the deforming plate 3, an entirety of the deforming plate 3 may be made of an insulating material. Alternatively, only parts of the projection 12 that make contact with the contact plate 5 and the conduction plate 4 may be made of an insulating material. Alternatively, the projection n 12 may be coated by an insulator.

Importance hereof lies in that the contact portions 6, 23 are separated from the conduction plate 4 when the internal pressure of the casing 1 increases and the deforming plate 3 thereby deforms upward, as a result of which the impact is applied to the contact portions 6, 23, and that the state in which the contact plate 5 and the conduction plate 4 are electrically insulated is maintained after the current passage has been cut off.

In all of the above embodiments, the deforming plate 3 is configured to deform by the snap bucking when the pressure in the casing 1 is increased. However, the deforming plate 3 may deform according to a different configuration when the pressure in the casing 1 is increased. For example, the deforming plate 3 may gradually deform according to the pressure in the casing 1.

In the above embodiments, the case body 96 of the current interruption device 2 is configured by the outer periphery of the deforming plate 3, the outer periphery of the conduction plate 4, and the outer periphery of the cover 40 being retained integrally. However, the current interruption device 2 may comprise a case body 96 with a different configuration. Specifically, for example, the container-shaped case body 96 and the like may not be provided. Further, the case body 96 does not have to have a configuration belonging to the current interruption device 2. For example, a casing or the like of the electricity storage device 100 may configure a part or a whole of the case body 96.

In the above embodiments, the current interruption devices 2, 203, 205, 206, 207, 208 are arranged on the current passage that connects the negative pole and the negative terminal 19. However, these current interruption devices may be arranged on a current passage that connects the positive pole and the positive terminal 119.

In the above embodiments, the current interruption device 2 is arranged under the negative terminal 19. However, a position at which the current interruption device 2 is to be arranged may be arbitrary. That is, the current interruption device 2 will suffice so long as it is arranged on the current passage between the electrode assembly 60 and the negative terminal 19, or on the current passage between the electrode assembly 60 and the positive terminal 119.

In the above embodiments, the contact plate 5 is electrically connected to the negative terminal 19, and the conduction plate 4 is electrically connected to the electrode assembly 60. However, the contact plate 5 may be electrically connected to the electrode assembly 60, and the conduction plate 4 may be electrically connected to the negative terminal 19 (or the positive terminal 119).

In the above embodiments, the lower surface of the pressure receiving portion 22 of the deforming plate 3 is facing the space 25 in the casing 1. However, the lower surface of the pressure receiving portion 22 may face another space that is maintained in a same pressure as the space 25.

In the above embodiments, the space 25 of the casing 1 is an example of a "first space", and the internal space 98 of the current interruption device 2 is an example of a "second space". Further, the negative terminal 19 and the positive terminal 119 are examples of an "electrode terminal" in the claims. Further, the upper end in FIG. 2 of the cylinder portion 42 of the cover 40 is an example of a "one side" of the cover in the claims, and the lower end in FIG. 2 of the main body 41 of the cover 40 is an example of "the other side" of the cover.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

REFERENCE SIGNS LIST

1 Casing
2, 203, 205, 206, 207, 208 Current Interruption Device
3, 79 Deforming Plate
3, 92 Contact Plate
3 Deforming Plate
4, 36 Conduction Plate
5 Contact Plate
6 First Contact Portion
11 Supporting Member
12 Projection
19 Negative Terminal
23 Second Contact Portion
24 Contacting Portion
25, 26, 27, 28, 29 Space
32 Communicating Hole
34 Fixing Member
40 Cover
41 Main Body
42 Cylinder Portion
45 Connecting Portion
46 Outer Thread
47, 49 Inner Thread
48 Attachment Surface
60 Electrode Assembly
74 Cap
75 Contacting Member
76 Cap Part
77 Guide Portion
90 Electricity Storage Device
98 Internal Space
119 Positive Terminal

The invention claimed is:

1. A current interruption device used for an electricity storage device, the current interruption device configured to electrically connect a positive or negative electrode terminal and an electrode assembly that comprises a positive electrode and a negative electrode, and to interrupt a serial current path of the positive or negative electrode terminal and the electrode assembly when an internal pressure of a closed casing accommodating the electrode assembly rises above a predetermined level, the current interruption device comprising:
   a deforming plate configured to deform when the internal pressure rises above the predetermined level, wherein the deforming plate is a diaphragm;
   a contact plate and a conducting plate which configures the current path in a state where the contact plate and the conducting plate are electrically connected to the electrode assembly and the positive or negative electrode terminal, wherein the contact plate is a diaphragm; and
   a conductive connecting member protruding from a side of the conducting plate and extending away from the deforming plate in a radial direction of the current interruption device,
   wherein
   the conducting plate is disposed to be intervened between the deforming plate and the contact plate, and is provided with a first communicating hole,
   the conducting plate includes a first contact portion configured to contact the contact plate and a breakable groove provided at least partially around the first contact portion,
   the contact plate includes a second contact portion configured to contact the first contact portion, and is provided with a second communicating hole,
   a first space is provided in the casing,
   a second space is provided between the deforming plate and the contact plate,
   an outside of the casing and the second space are communicated by the first communicating hole and the second communicating hole,
   the deforming plate includes one surface of the deforming plate on an opposite side from the contact plate, facing the first space, a pressure of which is retained to a same pressure as the internal pressure of the casing, and the other surface opposed to the contact plate facing the second space, a pressure of which is retained to a same pressure as an external pressure of the casing through the first communicating hole and the second communicating hole,
   a center portion of the deforming plate includes an insulating projection projecting toward the contact plate, and a contacting portion formed on the insulating projection configured to contact the first contact portion or the second contact portion, and
   at least the second contact portion, among the first contact portion and the second contact portion, is configured to be separable from the conducting plate by deformation of the deforming plate causing the contacting portion to move toward the contact plate when the internal pressure rises above the predetermined level, and
   when the deforming plate deforms upward toward the conducting plate, the insulating projection collides into the conducting plate so as to break off the first contact portion from the conducting plate at the breakable groove.

2. The current interruption device according to claim 1 further comprising:
   a conductive cover electrically connected to the contact plate, wherein
   one side portion of the conductive cover is exposed to the outside of the casing through an opening provided on the casing, and the other side portion of the conductive cover configures a part of a case body of the current interruption device,
   a communicating hole piercing the conductive cover from one side portion to the other side portion is provided in the conductive cover, and
   the second space is retained to the same pressure as the external pressure of the casing through the communicating hole.

3. The current interruption device according to claim 2, wherein
   the one side of the conductive cover exposed to the outside of the casing includes a connecting portion connecting a conductive member configured to supply electric power to an external device from the electrode assembly.

4. The current interruption device according to claim 3, wherein
   the connecting portion is provided on an inner surface of the communicating hole of the conductive cover and includes an inner thread for fixing the conductive member.

5. The current interruption device according to claim 2, wherein
   an outer thread is provided on a side surface on the one side of the conductive cover exposed to the outside of the casing, and
   the current interruption device is fixed to the casing by holding a wall of the casing between a fixing member engaged with the outer thread and a part of the conductive cover positioned in the casing.

6. The current interruption device according to claim 1 further comprising:
   a contacting member disposed between the deforming plate and the conducting plate; and
   an insulating cap,
   wherein
   the insulating projection is composed of the contacting member and the cap,
   the contacting member is disposed in a center portion of a surface of the deforming plate facing the conducting plate,
   the cap includes a cap portion covering the contacting member, and a guide portion regulating a position of the cap portion in a plane orthogonal to a direction connecting the deforming plate and the conducting plate.

7. An electricity storage device comprising:
   the current interruption device according to claim 1.

* * * * *